United States Patent
Van Den Bosch et al.

(10) Patent No.: US 6,602,925 B1
(45) Date of Patent: Aug. 5, 2003

(54) OPEN-CELLED POLYURETHANE FOAMS CONTAINING GRAPHITE WHICH EXHIBIT LOW THERMAL CONDUCTIVITY

(75) Inventors: Ronald Van Den Bosch, St Jansteen (NL); Hans A. G. De Vos, Terneuzen (NL)

(73) Assignee: Dow Global Technologies Inc., Midland, MI (US)

( * ) Notice: Subject to any disclaimer, the term of this patent is extended or adjusted under 35 U.S.C. 154(b) by 0 days.

(21) Appl. No.: 09/890,584

(22) PCT Filed: Feb. 2, 2000

(86) PCT No.: PCT/US00/02703

§ 371 (c)(1),
(2), (4) Date: Oct. 18, 2001

(87) PCT Pub. No.: WO00/46284

PCT Pub. Date: Aug. 10, 2000

Related U.S. Application Data

(60) Provisional application No. 60/118,319, filed on Feb. 2, 1999.

(51) Int. Cl.$^7$ .................................................. C08J 9/00
(52) U.S. Cl. ......................... 521/99; 521/170; 521/174
(58) Field of Search ........................... 521/99, 170, 174

(56) References Cited

U.S. PATENT DOCUMENTS

| | | | | |
|---|---|---|---|---|
| 4,698,369 A | | 10/1987 | Bell | 521/99 |
| 4,722,945 A | | 2/1988 | Wood et al. | 521/65 |
| 4,970,243 A | | 11/1990 | Jacobs et al. | 521/155 |
| 4,977,194 A | | 12/1990 | Haas et al. | 521/99 |
| 5,023,380 A | | 6/1991 | Babb et al. | 568/34 |
| 5,198,483 A | * | 3/1993 | Gainer | 521/108 |
| 5,654,344 A | * | 8/1997 | Falke et al. | 521/172 |
| 5,721,281 A | | 2/1998 | Blount | 521/50 |
| 6,084,008 A | * | 7/2000 | Liu | 521/107 |

FOREIGN PATENT DOCUMENTS

| | | |
|---|---|---|
| EP | 0464204 | 1/1992 |
| GB | 2226033 | 6/1990 |

* cited by examiner

Primary Examiner—John M. Cooney, Jr.

(57) ABSTRACT

A process is disclosed for preparing an open-celled rigid polyurethane foam by reacting an organic polyisocyanate with a polyol in the presence of a blowing agent, a cell opening agent and exfoliating graphite, wherein the thermal conductivity of the foam is from 28 to 35 mw/mk. Such foams are applicable in the construction industry where it is desired to have a foam having flame retardation properties and a low thermal conductivity.

12 Claims, No Drawings

OPEN-CELLED POLYURETHANE FOAMS CONTAINING GRAPHITE WHICH EXHIBIT LOW THERMAL CONDUCTIVITY

This application claims benefit of U.S. Ser. No. 60/118, 319 filed Feb. 2, 1999.

The present invention relates to the preparation of open-cell rigid polyurethane foams having improved flame retardant properties based on the inclusion of exfoliating graphite in the foams.

There are numerous approaches in the art to enhance the flame retardation properties of polymeric foams. A common approach for rigid polyurethane foams is to include halogenated or phosphorous-containing compounds in the composition. Another approach is the use of melamine as a flame retardant either alone or in combination with other flame retardants. Other approaches include changes in the molecular structure of the polymer, for example, polyisocyanuarate formation or higher concentrations of aromatic units. Such approaches generally require relatively large amounts of the particular flame retardant. For example, U.S. Pat. No. 4,221,875 discloses the use of 20 to 100 parts of melamine powder per hundred parts of the polyhydroxyl compound.

Another flame retardant which has been reported to give flame retardant properties to foams, particularly in the flexible foam area is expandable (exfoliating) graphite, see for example U.S. Pat. Nos. 4,698,369 and 5,023,280.

Despite the abundance of disclosed processes to obtain flame retardant foams, there continues to be a need to improve the fire retardant properties of foams. Accordingly it is an object of the present invention to provide a process for preparing a flame-retardant open-celled rigid foam which is capable of passing the B2 test (German norm DIN-4102 Teil 1, Mai 1998, baustoffklasse B2). It is another objective of the present invention to produce such foams utilizing exfoliating graphite as the sole frame retardant agent. It is still another object of the present invention to provide foams which meet the B2 fire test. A further objective of the present invention is to provide a process for preparing a flame-retardant open-cell rigid foam free from the use of halogenated chlorofluorocarbons, chlorofluorocarbons or volatile organic compounds as blowing agent. Such foams are particularly useful in application where it is desired to use a low density foam which has thermal insulating properties and can provide structural stability.

The present invention is to a process for preparing an open-celled rigid polyurethane foam by reacting an organic polyisocyanate with a polyol in the presence of a blowing agent, a cell-opening agent and exfoliating graphite.

The present invention is also to a polyurethane foam having a density of 10 to 45 kg/M$^3$ and a thermal conductivity of 28 to 35 mw/mk wherein the foam contains greater than 50 percent open cells and contains 2 percent or greater by weight of exfoliating graphite.

The present invention further provides for a process to produce such foams wherein the blowing agent is substantially water.

The foams prepared by the process of the present invention can pass the B2 test without the need for additional flame retardant agents, such as halogenated compounds or phosphate ester. The foams are therefor produced without the need for a volatile flame retardant. Due to the fine cell structure, the foams have a low thermal conductivity while maintaining their compressive strength. Foams having a low thermal conductivity and high compressive strength are ideally suited for insulating construction applications. The addition of other flame retardant agents to the foams further enhances the flame retardation properties of the foam.

It has unexpectedly been found that open-cell foams can be produced with exfoliating graphite as the sole fire retardant where the foams have improved flame retardation properties and still maintain a high compressive strength with no thermal conductivity aging as compared to standard closed cell foams. This unexpected result is obtained when the foam mix contains cell opening agents such that the cell size is 300 µm or less. The use of exfoliating graphite as the sole fire retardant also allows the production of flame retardant foams which are free or have reduced amounts of volatile compounds.

Polyisocyanates useful in making polyurethane foams for use in the present invention include aliphatic and cycloaliphatic and preferably aromatic polyisocyanates or combinations thereof, advantageously having an average of from 2 to 3.5, and preferably from 2 to 3.2 isocyanate groups per molecule. A crude polyisocyanate may also be used in the practice of this invention, such as crude toluene diisocyanate obtained by the phosgenation of a mixture of toluene diamine or the crude diphenylmethane diisocyanate obtained by the phosgenation of crude methylene diphenylamine. The preferred polyisocyanates are aromatic polyisocyanates such as disclosed in U.S. Pat No. 3,215,652.

Especially preferred polyisocyanates for use in the present inventions are polymethylene polyphenylene polyisocyanates (MDI). As used herein MDI refers to polyisocyanates selected from diphenylmethane diisocyanate isomers, polyphenyl polymethylene polyisocyanates and derivatives thereof bearing at least two isocyanate groups. In addition to the isocyanate groups, such compounds may also contain carbodiimide groups, uretonimine groups, isocyanurate groups, urethane groups, allophanate groups, urea groups or biuret groups. MDI is obtainable by condensing aniline with formaldehyde, followed by phosgenation, which process yields what is called crude MDI. By fractionation of crude MDI, polymeric and pure MDI can be obtained. The crude, polymeric or pure MDI can be reacted with polyols or polyamines to yield modified MDI. The MDI advantageously has an average of from 2 to 3.5, and preferably from 2.0 to 3.2 isocyanate groups per molecule. Especially preferred are methylene-bridged polyphenyl polyisocyanates and mixtures thereof with crude diphenylmethane diisocyanate, due to their ability to cross-link the polyurethane.

The total amount of polyisocyanate used to prepare the polyurethane foam should be sufficient to provide an isocyanate reaction index of typically from 60 to 300. Preferably the index is greater than 70. More preferably the index is greater than 80. Preferably the index is no greater than 250. More preferably the index is no greater than 220. An isocyanate reaction index of 100 corresponds to one isocyanate group per isocyanate reactive hydrogen atom present from the water and the polyol composition.

Polyols which are useful in the preparation of the polyisocyanate-based cellular foams include those materials having two or more groups containing an active hydrogen atom capable of undergoing reaction with an isocyanate. Preferred among such compounds are materials having at least two hydroxyl, primary or secondary amine, carboxylic acid, or thiol groups per molecule. Compounds having at least two hydroxyl groups per molecule, are especially preferred due to their desirable reactivity with polyisocyanates.

Generally typically polyols suitable for preparing polyurethanes include those having an average molecular weight of 100 to 10,000. Such polyols also advantageously have a functionality of at least 2, preferably 3, and up to 6, preferably up to 8, active hydrogen atoms per molecule. For the production of a rigid foam, it is preferred that the polyol or a polyol blend have an average molecular weight of 100 to 2,000 and an average functionality of 2 or greater, generally in the range of 2 to 8. More preferred are polyols or polyol blends which have an average molecular weight of 150 to 1,100.

Representative of polyols include polyether polyols, polyester polyols, polyhydroxy-terminated acetal resins, hydroxyl-terminated amines and polyamines. Examples of these and other suitable isocyanate-reactive materials are described more fully in U.S. Pat. No. 4,394,491. Preferred are polyols prepared by adding an alkylene oxide, such as ethylene oxide, propylene oxide, butylene oxide or a combination thereof, to an initiator having from 2 to 6, preferably 3 to 4 active hydrogen atoms.

Due to the fire retardant properties associated with aromatic-initiated polyols, it is advantageous to use an aromatic-initiated polyether polyol as the polyol or part of a polyol blend. Further to the polyols described above, amine-initiated polyols can be used. Advantageously, the aromatic-initiated polyether polyol is an alkylene oxide adduct of a phenol/formaldehyde resin, frequently called a "novolac" polyol, such as disclosed in U.S. Pat. Nos. 3,470,118 and 4,046,721, or an alkylene oxide adduct of phenol/formaldehyde/alkanolamine resin, frequently called a "Mannich" polyol such as disclosed in U.S. Pat. Nos. 4,883,826; 4,939,182; and 5,120,815.

The fire retardant material used in the foams of the present invention is exfoliating (expandable graphite). Exfoliating graphite is graphite containing one or more exfoliating agents such that considerable expansion occurs upon exposure to heat. Exfoliating graphite is prepared by procedures known in the art. Generally graphite is first modified with oxidants, such as nitrates, chromates, peroxides, or by electrolysis to open the crystal layer and then nitrates or sulfates are intercalated within the graphite.

The amount of exfoliating graphite used in the foams to give the desired physical properties is generally less than 50 percent by weight of the final foam. Preferably the amount of graphite is 40 percent or less by weight of the final foam. More preferred is 30 percent or less by weight of graphite in the final foam. Most preferred are foams which contain 20 percent or less by weight of graphite. To meet the B2 test, the foams generally contain 2 percent or greater by weight of graphite. More preferred are foams containing 3 percent or greater by weight of graphite. Most preferred are foams which contain 3 to 10 percent by weight of graphite in the foam.

In accordance with this invention, the walls of the individual cells in the foams are ruptured during the foaming process. The rupture of the cell walls is accomplished by the inclusion of a solid or liquid cell-opening agent. Such cell-opening agents are know in the art and are generally surface actives substances such as surfactants, fatty acid polyols or castor oil and modifications thereof and materials having a critical surface free energy of less than 23 $mJ/m^2$ as described in U.S. Pat. No. 5,312,846. A combination of these cell-opening agents may also be used.

Examples of surface active substances include compounds that support the homogenization of the starting materials and are optionally also suitable for regulating cell structure. Examples include emulsifiers such as the sodium salts of fatty acids as well as salts of fatty acids with amines, for example, diethanolamine oleate, diethanolamine stearate, diethanolamine ricinoleate, salts of sulfonic acids, for example, alkali or ammonium salts of dodecylbenzenesulfonic acid or dinaphthylmethanedisulfonic acid and ricinoleic acid; foam stabilizers such as siloxane-oxalkylene polymers or copolymers and other organopolysiloxanes, oxethylated alkylphenols, oxethylated fatty alcohols, paraffin oils, castor oil and ricinoleic acid esters, turkey red oil and peanut oil; as well as cell regulators such as paraffins, fatty alcohols and dimethyl polysiloxanes. Furthermore, the oligomeric acrylates with polyoxyalkylene and fluoroalkane side groups are also suitable for improving the emulsifying effect, the cell structure and/or for stabilizing the foam. These surface-active substances are generally used in amount of 0.01 to 6 parts by weight based on 100 parts by weight of the polyol.

Such materials are commercially available, for example, TEGOSTAB B8466, TEGOSTAB B8919, TEGOSTAB 8450, and ORTEGOL 501 from Th. Goldschmidt AG, and Surfactant 6164 from OSI Specialties-Witco.

Examples of solid materials described in U.S. Pat. No. 5,312,846 include fluorinated polymers such as poly (hexafluoropropylene), poly(1,1-dihyro-perfluorooctyl methacrylate) and poly(tetrafluoroethylene). Such materials are available from ICI under the trademark FLUOROGLIDE including FL1710 and FL1200, and from Dupont under the trademark TEFLON including TEFLON MP 1100, TEFLON MP 1200, TEFLON MP 1300 and TEFLON MP 1500. Also disclosed are suitable liquid agents such as fluorinated organic compounds marketed by 3M under the trademark FLUORINERT including substances identified as FC-104, FC-75, FC-40, FC-43, FC-70, FC-5312 and FC-71 and substances marketed by Rhone-Poulence under the trademark FLUTEC including substances identified as PP3, PP6, PP7, PP10, PP11, PP24 and PP25.

It is preferred that the blowing agent consists essentially of water as the substantially sole blowing agent. The water reacts with isocyanate in the reaction mixture to form carbon dioxide gas, thus blowing the foam formulation. The amount of water added is generally in the range of 4 to 10 parts by weight per 100 parts by weight of polyol. Preferably water is added in the range of 4 to 8 parts, and more preferably from 5 to 7 parts per 100 parts of polyol.

If necessary, a volatile liquid such as a halogenated hydrocarbon or a lowing boiling hydrocarbon (boiling point of $-10°$ C. to $+70°$ C. at normal pressure), such as pentane and/or isomers thereof may be used.

In addition to the foregoing critical components, it is often desirable to employ certain other ingredients in preparing cellular polymers. Among these additional ingredients are catalysts, surfactants, preservatives, colorants, antioxidants, reinforcing agents, cross-linker, chain extenders, stabilizers and fillers. In making polyurethane foam, it is generally highly preferred to employ a minor amount of a surfactant to stabilize the foaming reaction mixture until it cures. Such surfactants advantageously comprise a liquid or solid organosilicone surfactant. Other, less preferred surfactants include polyethylene glycol ethers of long-chain alcohols, tertiary amine or alkanolamine salts of long-chain alkyl acid sulfate esters, alkyl sulfonic esters and alkyl arylsulfonic acids. Such surfactants are employed in amounts sufficient to stabilize the foaming reaction mixture against collapse and the formation of large, uneven cells. Typically, 0.2 to 5 parts of the surfactant per 100 parts by weight polyol are sufficient for this purpose.

One or more catalysts for the reaction of the polyol (and water, if present) with the polyisocyanate are advantageously used. Any suitable urethane catalyst may be used, including tertiary amine compounds and organometallic compounds. Exemplary tertiary amine compounds include triethylenediamine, N-methylmorpholine, N,N-dimethylcyclohexylamine, pentamethyldiethylenetriamine, tetramethylethylenediamine, 1-methyl-4-dimethylaminoethylpiperazine, 3-methoxy-N-dimethylpropylamine, N-ethylmorpholine, diethylethanolamine, N-cocomorpholine, N,N-dimethyl-N', N'-dimethyl isopropylpropylenediamine, N,N-diethyl-3-diethylaminopropylamine and dimethylbenzylamine. Exemplary organometallic catalysts include organomercury, organolead, organoferric and organotin catalysts, with organotin catalysts being preferred among these. Suitable tin catalysts include stannous chloride, tin salts of carboxylic acids such as dibutyltin di-2-ethyl hexanoate, as well as other organometallic compounds such as are disclosed in U.S. Pat. No. 2,846,408. A catalyst for the trimerization of polyisocyanates, resulting in a polyisocyanurate, such as an alkali metal alkoxide may also optionally be employed herein. Such catalysts are used in an amount which measurably increases the rate of polyurethane or polyisocyanurate formation. Typical amounts are 0.001 to 5 parts of catalyst per 100 parts by weight of polyol. Preferred catalysts are those that contain one or more reactive hydrogen atoms.

Alternatively, other flame-retardant ingredients, known per se, may be used in addition to the graphite. Examples of such ingredients include halogen and/or phosphorous- containing compounds, antimony oxides, boron-containing compounds, or hydrated aluminas. Generally, when present the supplemental flame retardant will be added in an amount from 5 to 20 weight percent of the final foam. The addition of a supplemental flame retardant will influence the amount of graphite which must be added to meet the B2 flame test.

The foams of the present invention generally have a density of 10 to 45 kg/m$^3$. Preferably the foams have a density of 15 to 35 kg/m$^3$.

In making a polyurethane foam, the polyol(s), polyisocyanate, perforating agent and other components, including exfoliating graphite are contacted, thoroughly mixed and permitted to expand and cure into a cellular polymer. It is often convenient, but not necessary, to pre-blend certain of the raw materials prior to reacting the polyisocyanate and active hydrogen-containing components. For example, it is often useful to blend the polyol(s), blowing agent, surfactants, catalysts, perforating agent, exfoliating graphite and other components except the polyisocyanates, and then contact this mixture with the polyisocyanate. In a preferred embodiment, the exfoliating graphite is homogeneously dispersed in the polyol component. Alternatively, all components can be introduced individually to the mixing zone where the polyisocyanate and polyol(s) are contacted. In such a process, the dispersion of exfoliating graphite in polyol may be added as a concentrate in the polyol by a separate line into the mixing zone. It is also possible to pre-react all or a portion of the polyol(s), in the absence of water, with the polyisocyanate to form a prepolymer.

The foams produced by the process of the present invention can be used wherever it is desired to use an insulating foam. The foams are particularly applicable as thermal insulation materials.

The following examples are given to illustrate the invention and should not be interpreted as limiting it in anyway. Unless stated otherwise, all parts and percentages are given by weight.

EXAMPLES

A description of the raw materials used in the examples is as follows.

Polyol A is a 90:10 blend of a sugar-initiated propylene oxide polyether polyol having a molecular weight of 614 and a hydroxyl number of 410 and a monopropylene glycol-initiated propylene oxide polyol having a molecular weight of 1011.

Polyol B is an aromatic initiated propylene oxide polyether polyol having a hydroxyl number of 196 and a molecular weight of 945.

IXOL B251 is a halogenated polyether polyol available from Solvay.

Saytex RB 79 is a diether diol of tetrabromophthalate anhydride Available from Albe Marle.

RA 640 is an ethylene diamine-initiated propylene oxide polyol having a molecular weight of 350 and a hydroxyl number of 640, available from The Dow Chemical Company.

RN 482 is a sorbitol initiated propylene oxide polyol having a molecular weight of 700 and a hydroxyl number of 480, available from The Dow Chemical Company.

B 8466 is a silicon based surfactant, available from Th. Goldschmidt Chemical Corporation.

TEFLON MP1100 is a poly(tetrafluoroethylene) available from E.l. DuPont DeNemours and Company.

DMMP is the flame retardant dimethyl methylphosphonate available from Albright & Wilson Ltd.

TCPP is the flame retardant additive tris(1-chloro-2-propyl) phosphate available from Albright & Wilson Ltd.

TEP is the flame retardant triethylphosphate available from Bayer Ag.

Graphite exfoliating graphite utilized in the examples was S15-PU120 obtained from Ajay Metachem, India.

Desmorapid DB is a dimethyl benzylamine catalyst available from Bayer Ag.

POLYCAT 5 is a pentamethyl-diethylene triamine catalyst available from Air Products and Chemicals, Inc.

M229 is a polymeric MDI available from The Dow Chemical Company.

A base polyol blend was prepared by mixing the following, given in parts by weight:

13 polyol A; 24.4 polyol B; 9.75 RA 649; 4.14 RN482; 6.5 glycerine; 1.58 B8466; and 1.86 MP1100 C.

To a beaker were added the base polyol, and then any additional flame retardants. Water and catalyst were then added to the above mixture and gently stirred. Isocyanate was added and the mixture stirred for 10 seconds at 3000 rpm and then poured into a 50 by 35 by 15 cm box mold. The characteristic of the foam produced with varying components is given in Table 1. To pass the B2 flame test, as measured by German norm DIN-4102 Teil 1, Mai 1998, baustoffklasse B2 the flame must be less than 15 cm.

TABLE I

|  | Control | 1 | 2 | 3 | 4 | 5 | 6 |
|---|---|---|---|---|---|---|---|
| Polyol A | 13 | 13 | 13 | 13 | 13 | 13 | 13 |
| Polyol B | 24.4 | 24.4 | 24.4 | 24.4 | 24.4 | 24.4 | 24.4 |
| Ixol B 251 | 6.97 | | | | | | |
| Saytex RB 79 | 11.38 | | | | | | |
| RA 640 | 9.75 | 9.75 | 9.75 | 9.75 | 9.75 | 9.75 | 9.75 |
| RN 482 | 4.14 | 4.14 | 4.14 | 4.14 | 4.14 | 4.14 | 4.14 |
| Glycerine | 6.5 | 6.5 | 6.5 | 6.5 | 6.5 | 6.5 | 6.5 |
| Water | 5.6 | 5.6 | 5.6 | 5.6 | 5.6 | 5.6 | 5.6 |
| B 8466 | 1.58 | 1.58 | 1.58 | 1.58 | 1.58 | 1.58 | 1.58 |
| MP 1100 | 1.86 | 1.86 | 1.86 | 1.86 | 1.86 | 1.86 | 1.86 |
| DMMP | 9.75 | 9.75 | | | | | |
| TCPP | 4.65 | 4.65 | | 14.45 | 14.45 | 7.2 | |
| TEP | | | 14.4 | | | | |
| Graphite | | 18.35 | 18.35 | 18.35 | 9 | 18.4 | 18.4 |
| Desmorapid DB | 0.23 | 0.23 | 0.23 | 0.23 | 0.23 | 0.23 | 0.23 |
| Polycat 5 | 0.37 | 0.37 | 0.37 | 0.37 | 0.37 | 0.37 | 0.37 |
| INDEX | 0.9 | 0.9 | 0.9 | 0.9 | 0.9 | 0.9 | 0.9 |
| M 229 | 151.39 | 140.94 | 140.94 | 140.94 | 140.9 | 140.9 | 140.9 |
| B2 | 13 | 5 | 6 | 7 | 12 | 10 | 12 |

The results show (Example 6) that the addition of graphite as the sole fire retardant, at a level of 8 percent by weight of the foam, was as effective in reducing the flame produced during the B2 test as a reference foam containing standard fire retardants. The use of graphite with additional flame retardants was also effective in reducing the flame as measured by the B2 test.

It is within the skill in the art to practice this invention in numerous modifications and variations in light of the above teachings. It is, therefore, to be understood that the various embodiments of this invention described herein may be altered without departing from the spirit and scope of this invention as defined by the appended claims.

What is claimed is:

1. A process for preparing an open-celled rigid polyurethane foam having an overall density of 10 to 45 kg/m³ by reacting an organic polyisocyanate with a polyol in the presence of a blowing agent, a cell opening agent and an effective amount of exfoliating graphite.

2. The process of claim 1 wherein the exfoliating graphite is present in an amount from 2 to 40 percent by weight of the foam.

3. The process of claim 2 wherein the exfoliating graphite is present in an amount from 3 to 20 percent by weight of the foam.

4. The prom of claim 1 wherein the foam has a thermal conductivity of 28 to 36 mw/mk.

5. The process of claim 1 wherein the cells are 300 µm or less.

6. The process of claim 1 wherein the blowing agent is water, an organic blowing agent, a hydrocarbon or a combination thereof.

7. The process of claim 6 wherein the blowing agent is substantially water.

8. The process of claim 7 wherein the foam has a density of 15 to 35 kg/m³.

9. The process of claim 1 wherein the polyol has an average molecular weight of 100 to 2,000.

10. The process of claim 9 wherein the polyol has an average molecular weight of 150 to 1,100.

11. The process of claim 9 wherein the polyol has a functionality of 2 to 8.

12. A polyurethane foam having a density of 10 to 35 kg/m³ and a thermal conductivity of 28 to 35 mw/mk wherein the foam contains greater than 50 percent open-cells having a diameter of less than 300 µm and contains 2 percent or more by weight of exfoliating graphite.

* * * * *